US012770974B2

(12) United States Patent
Kim et al.

(10) Patent No.: US 12,770,974 B2
(45) Date of Patent: Oct. 20, 2026

(54) SEPARATOR FOR ELECTROCHEMICAL DEVICE AND ELECTROCHEMICAL DEVICE INCLUDING THE SAME

(71) Applicant: LG ENERGY SOLUTION, LTD., Seoul (KR)

(72) Inventors: Min Ji Kim, Daejeon (KR); Ji Hyeon Kim, Daejeon (KR); Seon Woo Hwang, Daejeon (KR); Kyung Ryun Ka, Daejeon (KR); Min Gyu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 19/361,325

(22) Filed: Oct. 17, 2025

(65) Prior Publication Data

US 2026/0121222 A1 Apr. 30, 2026

(30) Foreign Application Priority Data

Oct. 30, 2024 (KR) ........................ 10-2024-0150287
Oct. 1, 2025 (KR) ........................ 10-2025-0143751

(51) Int. Cl.

| | |
|---|---|
| ***H01M 50/434*** | (2021.01) |
| ***H01M 10/0525*** | (2010.01) |
| ***H01M 50/443*** | (2021.01) |
| ***H01M 50/446*** | (2021.01) |
| ***H01M 50/451*** | (2021.01) |
| ***H01M 50/489*** | (2021.01) |

(52) U.S. Cl.
CPC ..... *H01M 50/434* (2021.01); *H01M 10/0525* (2013.01); *H01M 50/443* (2021.01); *H01M 50/446* (2021.01); *H01M 50/451* (2021.01); *H01M 50/489* (2021.01)

(58) Field of Classification Search
CPC ............. H01M 50/446; H01M 50/406; H01M 50/449; H01M 50/443; H01M 50/44; H01M 50/431; H01M 50/434; H01M 50/411; H01M 50/489; H01M 50/471; H01M 50/463; H01M 50/46; H01M 50/457; H01M 50/417; H01M 50/423; H01M 50/426; H01M 50/42; H01M 50/414; H01M 50/403; H01M 50/40; H01M 50/491; H01M 50/451; H01M 50/461; H01M 2300/0068; H01M 2300/0071; H01M 2300/0082; H01M 2300/0085; H01M 2220/20; H01M 10/0565; H01M 10/0562; H01M 10/4235; H01M 10/058; H01M 10/653; H01M 4/62–623; H01M 10/052; H01M 10/0525; H01M 50/454; H01M 4/00–2300/0097; Y02E 60/10; Y02T 10/70; Y02P 70/50; C23C 16/40; C08K 3/38; C08K 2003/385; C08K 2003/382
See application file for complete search history.

(56) References Cited

U.S. PATENT DOCUMENTS

| | | | | |
|---|---|---|---|---|
| 11,050,082 B1 * | 6/2021 | Rodrigues | ......... | H01M 10/0563 |
| 2012/0039824 A1 * | 2/2012 | Archer | ................... | B82Y 30/00 106/287.18 |
| 2018/0040865 A1 * | 2/2018 | Lee | ..................... | H01M 50/463 |
| 2020/0266414 A1 * | 8/2020 | Avison | ................ | H01M 50/491 |
| 2023/0368975 A1 * | 11/2023 | Stollwerck | ............. | H01G 4/224 |

FOREIGN PATENT DOCUMENTS

| | | | | |
|---|---|---|---|---|
| JP | 7002211 B2 | 1/2022 | | |
| KR | 10-2013-0097679 A | 9/2013 | | |
| KR | 10-2016-0059858 A | 5/2016 | | |
| KR | 10-2016-0061165 A | 5/2016 | | |
| KR | 10-2016-0145222 A | 12/2016 | | |
| KR | 10-2017239 B1 | 9/2019 | | |
| KR | 10-2019-0117275 A | 10/2019 | | |
| KR | 10-2020-0041691 A | 4/2020 | | |
| KR | 10-2115598 B1 | 5/2020 | | |
| KR | 10-2319810 B1 | 11/2021 | | |
| KR | 10-2410233 B1 | 6/2022 | | |
| KR | 10-2023-0052527 A | 4/2023 | | |
| KR | 10-2631754 B1 | 1/2024 | | |
| KR | 10-2024-0077057 A | 5/2024 | | |
| KR | 10-2024-0133518 A | 9/2024 | | |
| KR | 10-2024-0146230 A | 10/2024 | | |
| WO | WO-2021033795 A1 * | 2/2021 | .......... | H01M 50/446 |

OTHER PUBLICATIONS

WO-2021033795-A1—English translation via Espacenet, accessed Nov. 24, 2025 (Year: 2025).*
Yang et al., "Improved dielectric and energy storage properties of three dimensional BaTiO3/polyvinyl alcohol-boron nitride flexible dielectric composite via template infiltration strategy," IET Nanodielectrics, 7(2), p. 68-77. (Year: 2023).*
Wang et al., "Design strategy of barium titanate/polyvinylidene fluoride-based nanocomposite films for high energy storage," J. Mater. Chem. A (2020) 8 (3): p. 884-917 (Year: 2020).*
Wang et al., "High dielectric barium titanate porous scaffold for efficient Li metal cycling in anode-free cells," Nature Communications, vol. 12, No. 6536, 2021, pp. 1-11.

* cited by examiner

*Primary Examiner* — Allison Bourke
*Assistant Examiner* — Bethany C Garcia
(74) *Attorney, Agent, or Firm* — Birch, Stewart, Kolasch & Birch, LLP

(57) ABSTRACT

A separator for an electrochemical device of the present disclosure includes a porous substrate and a coating layer formed on at least one surface of the porous substrate. The coating layer includes a polymer binder, inorganic particles, and hexagonal boron nitride. The inorganic particles have a dielectric constant of 150 or more.

9 Claims, No Drawings

SEPARATOR FOR ELECTROCHEMICAL DEVICE AND ELECTROCHEMICAL DEVICE INCLUDING THE SAME

CROSS REFERENCES TO RELATED APPLICATIONS

This application is based on and claims priority from Korean Patent Application No. 10-2024-0150287, filed on Oct. 30, 2024 and Korean Patent Application No. 10-2025-0143751, filed on Oct. 1, 2025, with the Korean Intellectual Property Office, the disclosure of which is incorporated herein in its entirety by reference.

TECHNICAL FIELD

The present disclosure relates to a separator for an electrochemical device and an electrochemical device including the same.

BACKGROUND

An electrochemical device is configured to convert chemical energy into electrical energy using an electrochemical reaction, and in recent years, lithium secondary batteries, which have high energy density and voltage, long cycle life, and are applicable in various fields, have been widely used.

A lithium secondary battery may include an electrode assembly manufactured using a positive electrode, a negative electrode, and a separator disposed between the positive electrode and the negative electrode, and the electrode assembly may be accommodated in a case together with an electrolyte.

Meanwhile, the separator of the lithium secondary battery serves to prevent electrical contact between the positive electrode and the negative electrode while allowing movement of lithium ions between the electrodes, and plays an important role in the safety and performance of the battery.

SUMMARY

The present disclosure provides a separator for an electrochemical device including inorganic particles having a high dielectric constant and hexagonal boron nitride, thereby reducing gas generation and forming a uniform coating layer, and an electrochemical device including the same.

An aspect of the present disclosure provides a separator for an electrochemical device including a porous substrate and a coating layer formed on at least one surface of the porous substrate. The coating layer includes a polymer binder, inorganic particles, and hexagonal boron nitride, and the inorganic particles have a dielectric constant of about 150 or more.

The inorganic particles may be $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), $HfO_2$, $SrTiO_3$, $SnO_2$, $CeO_2$, NiO, ZnO, $ZrO_2$, $Y_2O_3$, $TiO_2$, or a mixture thereof.

The inorganic particles may have an average particle size (D50) from about 200 to 1,000 nm.

The volume ratio of the inorganic particles to the hexagonal boron nitride may be about 7:1 to 30:1.

The hexagonal boron nitride may have an average diameter from about 100 nm to 300 nm.

The hexagonal boron nitride may have an aspect ratio from about 5 to 30.

The coating layer may include the hexagonal boron nitride in an amount of about 10 vol % or less.

The coating layer may include the polymer binder in an amount from about 10 vol % to 30 vol %.

The thickness of the coating layer may range from about 0.5 μm to 2 μm.

In an aspect, the present disclosure provides an electrochemical device including a positive electrode, a negative electrode, and a separator disposed between the positive electrode and the negative electrode. The separator is the one for an electrochemical device according to the aspect described above.

The electrochemical device may be a lithium secondary battery.

A separator for an electrochemical device according to the present disclosure includes inorganic particles having a high dielectric constant and hexagonal boron nitride, and has a uniform coating layer, thereby reducing the amount of gas generated in the electrochemical device.

DETAILED DESCRIPTION

Hereinafter, each configuration of the present disclosure will be described in more detail so that those ordinarily skilled in the art to which the present disclosure pertains may readily implement the present disclosure. However, the following description is merely an example, and the scope of protection of the present disclosure is not limited by the following description.

The term "including" as used herein is used to list materials, compositions, devices, and methods useful for the present disclosure, and is not limited to the listed examples.

As used herein, the terms "about" and "substantially" are used to account for inherent manufacturing and material tolerances (+5%), and are used in the sense of covering a range or approximation of numerical values or degrees. These terms are used to prevent an infringer from unfairly taking advantage of disclosures in which precise or absolute values are provided merely to aid in understanding the present disclosure.

The term "electrochemical device" as used herein may mean, for example, a primary battery, a secondary battery, or a supercapacitor.

A separator may include a coating layer including a polymer binder and inorganic particles on at least one surface of a porous substrate. The inorganic particles may be connected to other inorganic particles by the polymer binder to form an interstitial volume, and lithium ions may move through the interstitial volume. In addition to fixing the inorganic particles, the polymer binder may impart adhesion to the coating layer, and the coating layer may be adhered to each of the porous substrate and the electrodes.

A large amount of gas that may be generated during storage or operation of an electrochemical device increases the resistance of the electrochemical device and causes a problem of reducing output and cycle characteristics. Accordingly, attempts have been made to apply inorganic particles having a high dielectric constant to a coating layer in order to reduce gas generation. Inorganic particles having a high dielectric constant have advantages in that they have low moisture absorbability and, during electrolyte impregnation, suppress decomposition of salts in the electrolyte, thereby reducing gas generation due to side reactions of the salts. However, inorganic particles having a high dielectric constant have a problem in that, due to their high density, they have a rapid sedimentation rate in a slurry, resulting in reduced dispersibility. As a result, when a non-uniform coating layer is formed, there arises a problem that the physical properties of the separator deteriorate.

The present disclosure provides a method for reducing the sedimentation rate of inorganic particles in a coating slurry to form a uniform coating layer, and a separator and an electrochemical device utilizing the same.

Although the present disclosure has been described above by way of embodiments, the present disclosure is not limited thereto, and may include combinations of one or more configurations among specific examples and embodiments by those ordinarily skilled in the art. Various changes and modifications may be made within the technical idea of the present disclosure and the scope of equivalents of the claims set forth below.

A separator for an electrochemical device according to an embodiment of the present disclosure includes a porous substrate and a coating layer formed on at least one surface of the porous substrate. The coating layer includes a polymer binder, inorganic particles, and hexagonal boron nitride (e.g., h-BN), and the inorganic particles have a dielectric constant of 150 or more.

The porous substrate may be a porous film having a plurality of pores, and may electrically insulate a positive electrode and a negative electrode so as to prevent a short circuit. For example, when the electrochemical device is a lithium secondary battery, the porous substrate may be an ion-conductive barrier that allows lithium ions to pass therethrough while blocking electrical contact between the positive electrode and the negative electrode. At least a portion of the pores may form a three-dimensional network communicating with the surface and the interior of the porous substrate, and a fluid may pass through the porous substrate via the pores.

The porous substrate may be formed of a material that is physically and chemically stable with respect to an organic solvent electrolyte. For example, the porous substrate may include, but is not limited to, resins such as polyolefins including polyethylene, polypropylene, and polybutylene, polyvinyl chloride, polyethylene terephthalate, polycycloolefin, polyethersulfone, polyamide, polyimide, polyamide-imide, nylon, polytetrafluoroethylene, and copolymers or mixtures thereof. For example, a polyolefin resin may be used. The polyolefin resin is processable into a relatively thin thickness and allows easy application of a coating slurry, and thus is suitable for manufacturing an electrochemical device having higher energy density.

The porous substrate may have a single-layer or multi-layer structure. The porous substrate may include two or more polymer resin layers having different melting points (Tm), and thus may provide a shutdown function in the event of thermal runaway of the battery. For example, the porous substrate may include a polypropylene layer having a relatively high melting point and a polyethylene layer having a relatively low melting point. According to an embodiment, the porous substrate may have a three-layer structure in which polypropylene, polyethylene, and polypropylene are sequentially laminated. As the temperature of the battery rises above a predetermined temperature, the polyethylene layer may melt and shut down the pores, preventing thermal runaway of the battery.

The thickness of the porous substrate may be about 1 μm to 100 μm. For example, the thickness of the porous substrate may be 10 μm to 90 μm, 20 μm to 80 μm, 30 μm to 70 μm, or 40 μm to 60 μm. According to an embodiment, the thickness of the porous substrate may range from about 1 μm to 30 μm. Alternatively, the thickness of the porous substrate may range from 5 μm to 15 μm, or from 8 μm to 13 μm. By adjusting the thickness of the porous substrate within the above ranges, it may be possible to minimize the volume of the electrochemical device while increasing the amount of active material contained in the electrochemical device and electrically insulating a positive electrode and a negative electrode.

The porous substrate may include pores having an average diameter from about 0.01 μm to 1 μm. For example, the size of the pores included in the porous substrate may be about 0.01 μm to 0.09 μm, about 0.02 μm to 0.08 μm, about 0.03 μm to 0.07 μm, or about 0.04 μm to 0.06 μm. According to an embodiment, the size of the pores may range from about 0.02 μm to 0.06 μm. By adjusting the pore size of the porous substrate within the above ranges, the overall air permeability and ionic conductivity of the manufactured separator may be adjusted.

The porous substrate may have an air permeability from about 10 s/100 cc to 100 s/100 cc. For example, the air permeability of the porous substrate may be about 10 s/100 cc to 90 s/100 cc, about 20 s/100 cc to 80 s/100 cc, about 30 s/100 cc to 70 s/100 cc, or about 40 s/100 cc to 60 s/100 cc. According to an embodiment, the air permeability of the porous substrate may range from about 50 s/100 cc to 70 s/100 cc. When the air permeability of the porous substrate is within the above ranges, the air permeability of the manufactured separator may be provided in a range suitable for securing the output and cycle characteristics of the electrochemical device.

The air permeability (s/100 cc) refers to the time (seconds) required for 100 cc of air to pass through a predetermined area of the porous substrate or separator under a constant pressure. The air permeability may be measured using a permeability tester (Gurley densometer) according to ASTM D 726-58, ASTM D 726-94, or JIS-P8117. For example, the time required for 100 cc of air to pass through a sample having an area of 1 square inch (or 6.54 $cm^2$) under an air pressure of 0.304 kPa or a water pressure of 1.215 $kN/m^2$ may be measured using a 4110N instrument of Gurley. For example, the time required for 100 cc of air to pass through a sample having an area of 1 square inch under a constant water pressure of 4.8 inches at room temperature may be measured using an EG01-55-1MR instrument of Asahi Seico.

The porous substrate may have a porosity from about 10 vol % to 60 vol %. For example, the porosity of the porous substrate may be about 15 vol % to 55 vol %, about 20 vol % to 50 vol %, about 25 vol % to 45 vol %, or about 30 vol % to 40 vol %. According to an embodiment, the porosity of the porous substrate may range from about 30 vol % to 50 vol %. When the porosity of the porous substrate is within the above ranges, the ionic conductivity of the manufactured separator may be provided in a range suitable for securing the output and cycle characteristics of the electrochemical device.

The porosity refers to the volume ratio of pores to the total volume of the porous substrate. The porosity may be measured by a method known in the art. For example, the porosity may be measured by a Brunauer-Emmett-Teller (BET) method using nitrogen gas adsorption, a capillary flow porometer method, or a water or mercury intrusion method.

The coating layer is formed on at least one surface of the porous substrate and includes a polymer binder, inorganic particles, and hexagonal boron nitride (h-BN). The coating layer may be formed by coating at least one surface of the porous substrate with a coating slurry including a polymer binder, inorganic particles, hexagonal boron nitride, and a dispersion medium. The coating layer includes an interstitial volume in which the inorganic particles and hexagonal boron nitride are connected by the polymer binder, and is adhered to the porous substrate to prevent thermal shrinkage of the porous substrate while allowing lithium ions to pass therethrough.

The thickness of the coating layer may range from about 0.5 μm to 2 μm. For example, the thickness of the coating layer may be about 0.5 μm to 1.75 μm, about 0.5 μm to 1.5 μm, about 0.75 μm to 2 μm, about 0.75 μm to 1.75 μm, about 0.75 μm to 1.5 μm, about 1.0 μm to 2.0 μm, about 1.0 μm to 1.75 μm, about 1.0 μm to 1.5 μm, 1.5 μm to 2.0 μm, or 1.5 μm to 1.75 μm. By adjusting the thickness of the coating layer within the above-described range, contraction of the porous substrate may be minimized and stable adhesion to the porous substrate may be achieved. In addition, by adjusting the thickness of the coating layer within the above-described range, an electrochemical device having high energy density due to thinning of the separator may be implemented.

The coating layer may have a density from about 3.7 $g/cm^3$ to 6.0 $g/cm^3$. For example, the coating layer may have a density from about 4.9 $g/cm^3$ to 5.2 $g/cm^3$, or from about 4.9 $g/cm^3$ to 6.0 $g/cm^3$. When the density of the coating layer is within the above-described range, a uniform coating layer may be formed, and the electrical resistance and dielectric breakdown voltage of the electrochemical device may be improved.

According to an embodiment, the inorganic particles may have a dielectric constant of about 150 or more. For example, the inorganic particles may have a dielectric constant of about 150 or more, about 200 or more, about 300 or more, about 500 or more, about 700 or more, about 1,000 or more, or about 10,000 or less. According to an embodiment, the inorganic particles may have a dielectric constant from about 300 to 10,000. When the inorganic particles have a dielectric constant within the above-described range, they may exhibit a spontaneous polarization state in the electrolyte and may interact with polar molecules and ions. Due to this interaction, decomposition of salts in the electrolyte may be suppressed to prevent side reactions, and the amount of gas that may be generated during storage or operation of the electrochemical device may be reduced.

The dielectric constant (e.g., relative permittivity) is a dimensionless physical quantity that represents the degree to which a dielectric causes polarization in an electric field and indicates the ratio to the dielectric constant of a vacuum. For example, the "dielectric constant" used in this specification may refer to a value measured at room temperature (25° C.) according to the ASTM D150 test method.

The inorganic particles may be $BaTiO_3$, Pb(Zr, Ti)$O_3$ (PZT), $Pb_{1-x}La_xZr_{1-y}Ti_yO_3$ (PLZT, 0<x<1, 0<y<1), $Pb(Mg_{1/3}Nb_{2/3})O_3$—$PbTiO_3$ (PMN-PT), $HfO_2$, $SrTiO_3$, $SnO_2$, $CeO_2$, NiO, ZnO, $ZrO_2$, $Y_2O_3$, $TiO_2$, or a mixture thereof. For example, the inorganic particles may be $BaTiO_3$, Pb(Zr, Ti)$O_3$ (PZT), $Pb_{1-x}La_xZr_{1-y}Ti_yO_3$ (PLZT, 0<x<1, 0<y<1), $Pb(Mg_{1/3}Nb_{2/3})O_3$—$PbTiO_3$ (PMN-PT), or a mixture thereof. When the above-described inorganic particles are applied to the coating layer, the amount of gas generation may be reduced due to the high dielectric constant within the above-described range, and at the same time, heat resistance may be imparted to the coating layer to prevent thermal shrinkage of the porous substrate. According to an embodiment, the inorganic particles may be $BaTiO_3$. Since $BaTiO_3$ has a high dielectric constant within the above-described range, the amount of gas generation of the electrochemical device may be reduced.

The average particle size (D50) of the inorganic particles may range from about 200 nm to 1,000 nm. For example, the average particle size (D50) of the inorganic particles may be about 200 nm or more, 300 nm or more, 400 nm or more, 450 nm or more, 500 nm or more, 550 nm or less, 600 nm or less, 800 nm or less, or 1,000 nm or less. When the average particle size (D50) of the inorganic particles is within the above-described range, an appropriate dielectric constant may be secured to suppress gas generation, and the sedimentation rate in the coating slurry may be maintained at an appropriate level to form a uniform coating layer.

The average particle size (D50) refers to the particle diameter at the 50% point of the cumulative particle number distribution. The particle size may be measured using a laser diffraction method. For example, after dispersing the powder to be measured in a dispersion medium, the particle size distribution may be calculated by introducing the powder into a commercially available laser diffraction particle size analyzer (e.g., Microtrac S3500) and measuring differences in diffraction patterns according to particle diameters when the particles pass through a laser beam. By calculating the particle size at the point corresponding to 50% of the cumulative particle number distribution based on particle diameters in the measuring device, the particle size (D50) of the particles may be measured.

The hexagonal boron nitride (h-BN) is a compound having a plate-shaped planar structure in which nitrogen atoms and boron atoms are bonded at a molar ratio of about 1:1. The hexagonal boron nitride, due to its unique plate-shaped structure, high aspect ratio, and low density, may not easily agglomerate with inorganic particles in the coating slurry, and may improve the dispersibility of the coating slurry by reducing the sedimentation rate. In the coating slurry, solid contents including a polymer binder, inorganic particles, and hexagonal boron nitride may sediment over time. The sedimentation rate of the solid contents may be influenced by, for example, the density of the inorganic particles, the density of the hexagonal boron nitride, and its inherent plate-shaped structure and aspect ratio. In an embodiment of the present disclosure, the sedimentation rate of the coating slurry, which will be described below, may be adjusted to improve the dispersibility of the coating slurry, and to determine the density and uniformity of the coating layer.

The hexagonal boron nitride may have an average diameter from about 100 nm to 300 nm. For example, the average diameter of the hexagonal boron nitride may be about 100 nm to 300 nm, about 100 nm to 250 nm, about 100 nm to 200 nm, about 100 nm to 150 nm, about 150 nm to 250 nm, or about 150 nm to 200 nm. When the hexagonal boron nitride has the average diameter within the above-described range, it may not easily agglomerate with inorganic particles in the coating slurry, its sedimentation rate may be maintained within an appropriate range, and the viscosity of the coating slurry may also be maintained at an appropriate level, thereby maintaining workability for coating layer formation. For example, when the average diameter of the hexagonal boron nitride satisfies the above-described range, the sedimentation rate in the coating slurry may be reduced, the dispersibility of the coating slurry may be improved, and the dielectric breakdown voltage and resistance may be improved during coating layer formation.

The thickness of the hexagonal boron nitride may range from about 5 nm to 100 nm. For example, the thickness of the hexagonal boron nitride may be about 5 nm to 75 nm, about 5 nm to 50 nm, about 5 nm to 30 nm, about 10 nm to 100 nm, about 10 nm to 75 nm, about 10 nm to 50 nm, about 10 nm to 30 nm, about 20 nm to 100 nm, about 20 nm to 75 nm, about 20 nm to 50 nm, or about 20 nm to 30 nm. When the thickness of the hexagonal boron nitride satisfies the above-described range, the sedimentation rate in the coating slurry may be reduced, and the insulating properties of the separator may be improved.

The aspect ratio of the hexagonal boron nitride may range from about 5 to 30. The aspect ratio refers to a value obtained by dividing the average diameter of the hexagonal boron nitride by its thickness. The average diameter and thickness may be measured, for example, by a laser diffraction method. When the hexagonal boron nitride has the aspect ratio maintained within the above-described range, it may not easily agglomerate with inorganic particles in the coating slurry, its sedimentation rate may be maintained within an appropriate range, and its insulating properties may not decrease to prevent lowering of the dielectric breakdown voltage of the separator. For example, when the aspect ratio of the hexagonal boron nitride satisfies the above-described range, the sedimentation rate in the coating slurry may be reduced, the dispersibility of the coating slurry may be improved, and the insulating properties of the separator may be improved.

The volume ratio of the inorganic particles to the hexagonal boron nitride may range from about 7:1 to 30:1. For example, the volume ratio of the inorganic particles to the hexagonal boron nitride may be about 8:1, 10:1, 15:1, 20:1, or 25:1. When the volume ratio of the inorganic particles is maintained within the above-described range, the overall density of the solid content in the coating slurry does not increase and the sedimentation rate does not rise, which may improve the dispersibility of the coating slurry. In addition, as the precipitation of the inorganic particles in the coating slurry is suppressed, a uniform coating layer is formed, and the dielectric breakdown voltage of the separator is not lowered. For example, when the volume ratio of the hexagonal boron nitride is maintained within the above-described range, the viscosity of the coating slurry does not increase, and even when the coating slurry is applied to and dried on the porous substrate, an interstitial volume may be properly formed, so that the resistance of the separator does not increase. For example, by adjusting the volume ratio of the inorganic particles to the hexagonal boron nitride to be within the above-described range, gas generation of the electrochemical device may be reduced, the sedimentation rate in the coating slurry may be decreased, and a high dielectric breakdown voltage and low resistance may be achieved due to the formation of a uniform coating layer.

The polymer binder may bind the inorganic particles and hexagonal boron nitride particles included in the coating layer and may impart adhesion to the coating layer. The polymer binder may include an acrylic binder, a fluorine-based binder, or a hybrid binder thereof, but is not limited thereto. For example, the acrylic binder may be one or more selected from polyacrylic acid, polyacrylamide, methyl acrylate, ethyl acrylate, isopropyl acrylate, n-butyl acrylate, isobutyl acrylate, ethylhexyl acrylate, methyl methacrylate, styrene-butadiene rubber, nitrile-butadiene rubber, acrylonitrile-butadiene rubber, acrylonitrile-butadiene-styrene rubber, and copolymers including one or more of the foregoing. For example, the fluorine-based binder may be one or more selected from polyvinylidene fluoride, polyvinylidene fluoride-hexafluoropropylene, and polyvinylidene fluoride-trichloroethylene.

The coating layer may include the hexagonal boron nitride in an amount of about 10 vol % or less. For example, the coating layer may include the hexagonal boron nitride in an amount of about 1 vol % to 10 vol %, 2 vol % to 10 vol %, 3 vol % to 10 vol %, or 3 vol % to 8 vol %. Within the above-described range of hexagonal boron nitride, the viscosity of the coating slurry may not increase and the porous substrate may be uniformly coated. For example, by adjusting the vol % of the hexagonal boron nitride within the above-described range, the sedimentation rate in the coating slurry may be improved while maintaining the viscosity at an appropriate level, thereby achieving thinning of the separator through a thin coating layer thickness.

The coating layer may include the polymer binder in an amount from about 10 vol % to 30 vol %. For example, the coating layer may include the polymer binder in an amount of about 10 vol % to 30 vol %, 12 vol % to 25 vol %, 15 vol % to 20 vol %, or 10 vol % to 15 vol %. By adjusting the content of the polymer binder within the above-described range, the inorganic particles and the hexagonal boron nitride may be bound, and the adhesion between the coating layer and the porous substrate may be maintained.

The separator for an electrochemical device may further include an adhesive layer formed on a surface of the coating layer. The adhesive layer may cover at least a portion of the surface of the coating layer and may impart adhesion of the separator to an electrode. The adhesive layer may be formed by additionally applying an adhesive layer-forming slurry including a polymer binder for the adhesive layer to the surface of the coating layer formed by drying the above-described coating slurry, and drying the adhesive layer-forming slurry. The applying may be performed using a bar coater, a wire bar coater, a roll coater, a spray coater, a spin coater, an inkjet coater, a screen coater, a reverse coater, a gravure coater, a knife coater, a slot die coater, a hot-melt coater, a comma coater, or a direct metering coater, but is not limited thereto. According to an embodiment, the adhesive layer may be formed by spraying and drying the adhesive layer-forming slurry. The adhesive layer may cover about 20% to 80% based on the surface of the coating layer.

The polymer binder for the adhesive layer may be the same as or different from the polymer binder described above. According to an embodiment, the polymer binder for the adhesive layer may be a fluorine-based binder, an acryl-based binder, or a mixture thereof. For example, the fluorine-based binder may be a particulate polyvinylidene fluoride-based binder. For example, the adhesive layer may include both the fluorine-based binder and the acryl-based binder, so that adhesion of the separator to the electrode may be stably maintained in both a dry state without an electrolyte and a wet state in which the separator is impregnated with an electrolyte. For example, the adhesive layer may include the fluorine-based binder and the acryl-based binder in a weight ratio from about 2:8 to 8:2, from about 3:7 to 7:3, or from about 4:6 to 6:4 as the polymer binder for the adhesive layer. The thickness of the adhesive layer may be formed to be smaller than the thickness of the coating layer, so as to provide adhesion to the electrode while minimizing deterioration of air permeability of the separator.

The separator for an electrochemical device may have a gas generation amount of about 1,000 μL or less. For example, the separator for an electrochemical device may have a gas generation amount of about 1,000 μL or less, 900 μL or less, 800 μL or less, 790 μL or less, or 500 μL or more. By adjusting the gas generation amount of the separator for an electrochemical device within the above-described range, the output and cycle characteristics of the electrochemical device may be improved. The gas generation amount may be measured by impregnating the separator for an electrochemical device in an electrolyte, storing it at room temperature for 12 hours, and then storing it at 130° C. for 1 hour to collect the generated gas.

The separator for an electrochemical device may have a dielectric breakdown voltage of 1.0 kV or more. For example, the separator for an electrochemical device may have a dielectric breakdown voltage of about 1.0 kV or more, 1.5 kV or more, 1.7 kV or more, 1.8 kV or more, or 2.1 kV or less. By adjusting the dielectric breakdown voltage of the separator for an electrochemical device within the above-described range, the insulating performance of the separator at high voltage may be maintained to prevent short circuits inside the electrochemical device, and stable battery performance may be maintained.

The dielectric breakdown voltage may be measured by applying a pressure of 8 MPa to the separator for an electrochemical device at 70° C. and then increasing the voltage at a rate of 100 mV/s until the current exceeds 0.5 mA and the duration exceeds 3 seconds.

The separator for an electrochemical device may have a moisture content of 3,000 ppm or less. The moisture may collectively refer to water included in the dispersion medium remaining during the drying process of the coating slurry, and water absorbed by the inorganic particles during the manufacturing, transportation, or storage process of the separator. The coating layer may include inorganic particles having a high dielectric constant so as to maintain the moisture content of the separator at a level of 3,000 ppm or less.

In an embodiment of the present disclosure, a coating slurry including a polymer binder, inorganic particles, hexagonal boron nitride, and a dispersion medium is provided. In an embodiment of the present disclosure, the high sedimentation rate in the coating slurry, which may result from the inclusion of inorganic particles having a high density, may be reduced by including hexagonal boron nitride having a low density and a high aspect ratio. Descriptions overlapping with those of the separator for an electrochemical device may be replaced with the descriptions of the preceding embodiments.

The coating slurry may include a dispersion medium to dissolve or disperse at least a portion of the polymer binder and to disperse the inorganic particles and the hexagonal boron nitride. The coating slurry may be used in which the polymer binder, inorganic particles, and hexagonal boron nitride are uniformly dispersed by adjusting the type and content of the dispersion medium. For example, the dispersion medium may be one selected from water, ethanol, acetone, isopropyl alcohol (IPA), dimethylacetamide (DMAc), dimethylformamide (DMF), N-methyl-2-pyrrolidone (NMP), acetonitrile, and combinations thereof. By using the above-described types of dispersion media, a coating slurry may be provided in which the polymer binder, inorganic particles, and hexagonal boron nitride are uniformly dispersed and the sedimentation rate is improved.

The dispersion medium contained in the coating slurry may be removed by drying or heating after the formation of the coating layer. During the process of removing the dispersion medium, a plurality of pores may be formed on the surface and within the coating layer. The pores may include interstitial volumes formed between the inorganic particles, and may have a structure forming a three-dimensional network through which a fluid may pass.

The coating slurry may further include additives such as a dispersant, a surfactant, a defoaming agent, and a flame retardant, so as to improve dispersibility and flame retardancy and enhance the uniformity of the formed coating layer. For example, the dispersant may include one or more selected from polyacrylic acid, oil-soluble polyamine, oil-soluble amine compounds, fatty acids, fatty alcohols, sorbitan fatty acid esters, tannic acid, and pyrogallol. By using the above types of dispersants, the stability of the coating slurry may be improved and the uniformity of the coating layer formed from the coating slurry may be ensured.

Based on the total weight of the coating slurry, the additive may be included in an amount from about 0 wt % to 5 wt %. For example, the content of the additive may be 0.01 wt % to 4 wt %, 0.1 wt % to 3 wt %, or 1 wt % to 2 wt %. According to an embodiment, the content of the additive may range from about 1 wt % to 5 wt %. By adjusting the content of the additive within the above-described range, uniform dispersion and stability of the inorganic particles and hexagonal boron nitride included in the coating slurry may be achieved.

According to an embodiment, the coating slurry may have a sedimentation rate of about 100 μm/s or less. For example, the coating slurry may have a sedimentation rate of about 100 μm/s or less, 90 μm/s or less, 70 μm/s or less, 50 μm/s or less, 30 μm/s or less, or 10 μm/s or more. When the sedimentation rate of the coating slurry is within the above-described range, solid content including the inorganic particles may be uniformly dispersed in the coating slurry, and during coating layer formation, the dielectric breakdown voltage of the separator may not decrease below an appropriate range. As a result, when the sedimentation rate of the coating slurry satisfies the above-described range, gas generation of the separator 100 for an electrochemical device may be suppressed and the dielectric breakdown voltage may be improved.

The sedimentation rate refers to the rate at which solid content settles in the coating slurry over time while the coating slurry is rotated at a predetermined rotational speed under centrifugal force. For example, the sedimentation rate may be measured using a dispersibility measuring device (e.g., product name: Turbiscan, manufacturer: Foulaction) by measuring the sedimentation rate (TSI, Turbiscan Stability Index) for 10 hours and using the measured value at 6 hours.

A method of manufacturing a separator for an electrochemical device according to an embodiment of the present disclosure includes the steps of preparing a coating slurry including a polymer binder, inorganic particles, hexagonal boron nitride, and a dispersion medium, coating at least one surface of a porous substrate with the coating slurry to form a coating layer, and drying the coating layer to remove the dispersion medium to manufacture the separator. Descriptions overlapping with those of the separator for an electrochemical device may be replaced with the descriptions of the preceding embodiments.

According to an embodiment, the step of preparing the coating slurry may include mixing $BaTiO_3$ as the inorganic particles, hexagonal boron nitride (h-BN), and a polymer binder in distilled water at an appropriate volume ratio. In addition, the coating slurry is prepared by maintaining the total solid content at an appropriate weight percentage and stirring the mixture, for example, using a shaker.

The step of forming the coating layer may be coating at least one surface of the porous substrate with a coating slurry including a polymer binder, inorganic particles, hexagonal boron nitride, and a dispersion medium. For example, the coating may be formed by using a bar coater, a wire bar coater, a roll coater, a spray coater, a spin coater, an inkjet coater, a screen coater, a reverse coater, a gravure coater, a knife coater, a slot die coater, a hot-melt coater, a comma coater, or a direct metering coater, but is not limited thereto.

According to an embodiment, the step of forming the coating layer may be coating one side of the porous substrate or simultaneously coating both sides with the coating slurry using a bar coater or a slot die coater.

The step of forming the coating layer may further include a step of corona discharge treatment on at least one surface of the porous substrate. For example, it may be coating the porous substrate with the coating layer-forming slurry after the step of corona discharge treatment. The step of corona discharge treatment on at least one surface of the porous substrate may prevent a decrease in adhesion between the surface of the porous substrate and the surface of the coating layer at high temperature, and may prevent or suppress a decrease in adhesion between these surfaces caused by the electrolyte.

The corona discharge treatment may be treating at least one surface of the porous substrate in air at a voltage from about 0.1 kV to 10 kV. For example, the corona discharge treatment may be treating the at least one surface of the porous substrate in air at a voltage of about 0.2 kV to 9 kV, about 0.3 kV to 8 kV, about 0.4 KV to 7 kV, about 0.5 kV to 6 kV, about 0.6 kV to 5 kV, about 0.7 kV to 4 kV, about 0.8 kV to 3 kV, about 0.9 kV to 2 kV, or about 1.0 kV to 2 kV. According to an embodiment, the corona discharge treatment may be treating the at least one surface of the porous substrate in air at a voltage of about 1.8 kV. By adjusting the applied voltage of the corona discharge treatment within the above range, an appropriate number of functional groups may be formed on the surface of the porous substrate, and damage to the surface of the porous substrate may be prevented or suppressed.

The step of removing the dispersion medium to manufacture the separator may be drying or heating the coating layer to evaporate the dispersion medium contained in the coating layer. The removing of the dispersion medium may be performed at a temperature that evaporates only the dispersion medium contained in the coating layer without deforming the polymer binder included in the coating layer. For example, the step of removing the dispersion medium may be heating the coating layer to a predetermined temperature such that the surface temperature of the coating layer does not exceed 60° C. When heating the coating layer under the above conditions, thermal energy may be first used to heat and phase-change the dispersion medium, and may not be used to deform the polymer binder.

The method of manufacturing the separator for an electrochemical device may further include a step of forming an adhesive layer by applying and drying an adhesive layer-forming slurry on the surface of the coating layer. For example, after drying the coating slurry and removing the dispersion medium to form a coating layer, an adhesive layer may be formed by applying an adhesive layer-forming slurry onto the surface of the coating layer and drying it.

A cylindrical lithium secondary battery according to an embodiment of the present disclosure is an electrochemical device including a positive electrode, a negative electrode, and a separator interposed between the positive electrode and the negative electrode. The separator is the one for an electrochemical device according to the above-described embodiment. The cylindrical lithium secondary battery may be manufactured by inserting an electrode assembly including a positive electrode, a negative electrode, and a separator interposed between the positive electrode and the negative electrode into a battery case and sealing the battery case. Before sealing the battery case, an electrolyte may be injected so that the electrode assembly is impregnated with the electrolyte. In this embodiment, a cylindrical lithium secondary battery is exemplified as the electrochemical device, but the present disclosure is not limited thereto and may be applied to other types of secondary batteries. For example, the electrochemical device may be a cylindrical, prismatic, coin-type, or pouch-type lithium secondary battery.

The positive electrode and the negative electrode may be those in which an electrode active material is applied and dried to be coated on at least one surface of each current collector. The current collector may be made of a material having conductivity without causing a chemical change in the electrochemical device. For example, the current collector for the positive electrode may be aluminum, nickel, titanium, baked carbon, stainless steel, or a material obtained by surface-treating aluminum or stainless steel with, for example, carbon, nickel, titanium, or silver, but is not limited thereto. For example, the current collector for the negative electrode may be copper, nickel, titanium, baked carbon, stainless steel, or a material obtained by surface-treating copper or stainless steel with, for example, carbon, nickel, titanium, or silver, but is not limited thereto. The current collector may be in various forms such as a metal sheet, a film, a foil, a net, a porous body, or a foam.

The positive electrode includes a positive electrode current collector and a positive electrode active material layer provided on at least one surface of the current collector. The positive electrode active material layer includes a positive electrode active material, a conductive material, and a binder resin. The positive electrode active material may contain one or a mixture of two or more of: layered compounds such as lithium manganese complex oxide (e.g., $LiMn_2O_4$ or $LiMnO_2$), lithium cobalt oxide ($LiCoO_2$), and lithium nickel oxide ($LiNiO_2$); lithium manganese oxides such as those expressed by the formula $Li1+xMn_{2-x}O_4$ (where x is 0 to 0.33), $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni site type lithium nickel oxide expressed by the formula $LiNi_{1-x}M_xO_2$ (where M=Co, Mn, Al, Cu, Fe, Mg, B or Ga, and x=0.01 to 0.3); lithium manganese complex oxides expressed by the chemical formula $LiMn_{1-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); $LiMn_2O_4$ in which part of Li in the chemical formula is replaced with an alkaline earth metal ion; disulfide compounds; and $Fe_2(MoO_4)_3$, or a mixture of two or more of these materials.

The negative electrode includes a negative electrode current collector and a negative electrode active material layer provided on at least one surface of the current collector. The negative electrode active material layer includes a negative electrode active material, a conductive material, and a binder resin. As the negative electrode active material, the negative electrode may include one or a mixture of two or more selected from the group consisting of: lithium metal oxide; carbonaceous materials such as non-graphitizable carbon, or graphitic carbon; metal composite oxides such as $Li_xFe_2O_3$ ($0 \le x \le 1$), $Li_xWO_2$ ($0 \le x \le 1$), or $Sn_xMe_{1-x}Me'_yO_z$ (Me: Mn, Fe, Pb, Ge; Me': Al, B, P, Si, Group 1, Group 2, Group 3 elements of the periodic table, or halogen; $0 < x \le 1$; $1 \le y \le 3$; $1 \le z \le 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; and titanium oxide.

The conductive material may be one or a mixture of two or more selected from graphite, carbon black, carbon fibers, metal fibers, metal powder, conductive whiskers, conductive metal oxides, carbon nanotubes, activated carbon, and polyphenylene derivatives. According to an embodiment, the conductive material may be one or a mixture of two or more selected from natural graphite, artificial graphite, acetylene black, channel black, furnace black, lamp black, thermal black, aluminum powder, nickel powder, zinc oxide, potassium titanate, and titanium oxide.

As the binder resin, a binder resin commonly used for electrodes of electrochemical devices may be used. Non-limiting examples of such binder resins may include polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, and carboxyl methyl cellulose, but are not limited thereto.

The electrolyte may be a salt having a structure of $A^+B^-$, in which $A^+$ includes alkali metal cations such as $Li^+$, $Na^+$, or $K^+$, or a combination thereof, and $B^-$ includes anions such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, or $C(CF_2SO_2)_3^-$, or a combination thereof. The salt may be dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof, but is not limited thereto.

The electrochemical device including the electrode assembly may be used as a unit cell, and may be used as a battery module including the unit cell, a battery pack including the battery module, or a device including the battery pack as a power source. The device may include, but is not limited to, small devices such as computers, mobile phones, or power tools; electric vehicles, such as electric vehicles (EVs) powered by an electric motor, hybrid electric vehicles (HEVs), or plug-in hybrid electric vehicles (PHEVs); electric two-wheeled vehicles, such as an electric bicycle (E-bike) or an electric scooter (E-scooter); electric golf carts; or medium- and large-sized devices such as power storage systems.

Hereinafter, the present disclosure will be described in more detail through examples and experimental examples. The following examples and experimental examples are provided for illustrative purposes only, and the present disclosure is not limited by the following examples and experimental examples.

Example 1

Preparation of Coating Slurry

At room temperature (25° C.), $BaTiO_3$ (average particle size: 500 nm, dielectric constant: 2,000, density: 6.0 g/cm$^3$) as the inorganic particles, hexagonal boron nitride (average diameter: 150 nm, thickness: 30 nm, density: 2.1 g/cm$^3$), and a particulate acrylic binder (styrene butyl acrylate) as the polymer binder were added into distilled water in a volume ratio of 82:3:15. At this time, the total solid content was 30 wt %, and the mixture was stirred using a shaker for 60 minutes to prepare a coating slurry.

Preparation of Porous Substrate

As the porous substrate, a polyethylene film with a thickness of 9 μm was used, which has an MI of 0.2 g/10 min, a Tm of 135° C., a porosity of 45%, and an average pore size of 45 nm.

Manufacture of Separator

The coating slurry was coated on both sides of the polyethylene film using a bar coater. A low-temperature air flow was applied to the film coated with the coating slurry, and the dispersion medium was removed by drying while controlling the surface temperature of the coating layer not to exceed 60° C., thereby forming a coating layer with a thickness of 1.5 μm for each coating.

Example 2

A separator was manufactured in the same manner as in Example 1, except that $BaTiO_3$, hexagonal boron nitride, and a polymer binder were added in a volume ratio of 80:5:15.

Example 3

A separator was manufactured in the same manner as in Example 1, except that $BaTiO_3$, hexagonal boron nitride, and a polymer binder were added in a volume ratio of 77:8:15.

Example 4

A separator was manufactured in the same manner as in Example 1, except that $BaTiO_3$, hexagonal boron nitride, and the polymer binder were added at a volume ratio of 84:1:15.

Comparative Example 1

A separator was manufactured in the same manner as in Example 1, except that hexagonal boron nitride was not used, and $BaTiO_3$ and a polymer binder were added in a volume ratio of 85:15.

Comparative Example 2

A separator was manufactured in the same manner as in Example 1, except that $BaTiO_3$, hexagonal boron nitride, and a polymer binder were added in a volume ratio of 73:12:15.

Comparative Example 3

A separator was manufactured in the same manner as in Example 1, except that $BaTiO_3$ was not used, and hexagonal boron nitride and a polymer binder were added in a volume ratio of 85:15.

Comparative Example 4

A separator was manufactured in the same manner as in Comparative Example 1, except that alumina (average particle diameter: 500 nm, dielectric constant: 9) was used instead of $BaTiO_3$.

Experimental Example 1. Evaluation of Physical Properties of Coating Slurry

Evaluation of Sedimentation Rate

The coating slurries of the examples and comparative examples were measured for sedimentation rate (TSI, Turbiscan Stability Index) for 10 hours using a dispersibility measuring device (product name: Turbiscan, manufacturer: Foulaction), and the sedimentation rate at 6 hours was evaluated.

Measurement of Viscosity

The coating slurries of the examples and comparative examples were measured using a cone-plate type viscometer (product name: TV-22, manufacturer: Toki-Sangyo).

Experimental Example 2. Evaluation of Physical Properties of Separators

Measurement of Gas Generation Amount

The separators of the examples and comparative examples were sampled to a size of 560 $cm^2$. As the electrolyte, a solvent prepared by mixing ethylene carbonate and ethyl methyl carbonate at a volume ratio of 3:7 and adding 1.2 mol of lithium salt $LiPF_6$ was used. The sampled separators and the electrolyte were put into 21700-size cylindrical cans, sealed, stored at room temperature for 12 hours, and then stored in a 130° C. chamber for 1 hour. The gas generated inside the cans was collected using a BGA-06 device, and the gas generation amounts were measured.

Measurement of Dielectric Breakdown Voltage

For the separators of the examples and comparative examples, a pressure of 8 MPa was applied at 70° C. using a Chroma AC/DC/IR HIPOT TESTER (Model 19052), then the voltage was increased at a rate of 100 mV/s, and the voltage was measured when 0.5 mA and 3 seconds were exceeded.

Measurement of Air Permeability

Regarding the air permeability, the times required for 100 cc of air to pass through the separators with a diameter of 28.6 mm and an area of 645 $mm^2$ were measured using a Gurley densometer (Gurley, 4110N).

separator is maintained at about 775 μL to 790 μL, which is 1,000 μL or less, and the dielectric breakdown voltage is maintained at a relatively high level of 1.83 kV to 2.0 kV. In addition, it can be seen that the sedimentation rate is maintained at about 28 μm/s to 90 μm/s, which is 100 μm/s or less.

Meanwhile, in the case of Comparative Example 1 in which hexagonal boron nitride was not used, the sedimentation rate was relatively fast at 140 μm/s, and in the case of Comparative Example 4 in which alumina was included instead of $BaTiO_3$ as the inorganic particles, the gas generation amount showed a significantly high value of 4,200 μL.

In Table 1, Comparative Example 2 could not achieve the same thickness of 1.5 μm due to the high viscosity of the coating slurry. In addition, Comparative Example 3 had a coating slurry viscosity at the level of paste, which was too high to perform coating on the porous substrate itself.

Although the present disclosure has been described with reference to exemplary drawings as illustrated above, it is apparent that the present disclosure is not limited to the embodiments and drawings disclosed herein, and that various modifications may be made by those ordinarily skilled in the art within the spirit and scope of the present disclosure. Furthermore, even if operational effects according to the configuration of the present disclosure have not been explicitly described above in the course of describing the embodiments of the present disclosure, it is natural that predictable effects according to the configuration should also be considered to fall within the scope of the present disclosure.

What is claimed is:

1. A separator for an electrochemical device, the separator comprising:

a porous substrate; and a coating layer formed on at least one surface of the porous substrate, wherein the coating layer includes a polymer binder, inorganic particles, and hexagonal boron nitride,

TABLE 1

| | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Coating layer thickness (μm) | 1.5 | 1.5 | 1.5 | 1.5 | 1.5 | — | — | 1.5 |
| Inorganic particles (vol %) | 82 | 80 | 77 | 84 | 85 | 73 | 0 | 85 (Alumina) |
| Hexagonal boron nitride (h-BN) (vol %) | 3 | 5 | 8 | 1 | 0 | 12 | 85 | 0 |
| Polymer binder (vol %) | 15 | 15 | 15 | 15 | 15 | 15 | 15 | 15 |
| Solid content (wt %) | 30 | 30 | 30 | 30 | 30 | 30 | 30 | 30 |
| Coating layer density ($g/cm^3$) | 5.2 | 5.1 | 5.0 | 5.2 | 5.3 | 4.8 | 2.0 | 3.6 |
| Sedimentation rate (μm/s) | 40 | 35 | 28 | 90 | 140 | 5 | — | 30 |
| Slurry viscosity (cps) | 7.1 | 7.8 | 11.6 | 6.2 | 5.4 | 31.5 | — | 8.3 |
| Gas generation amount (μL) | 785 | 775 | 790 | 775 | 780 | — | — | 4,200 |
| Dielectric breakdown voltage (kV) | 1.9 | 1.92 | 2.0 | 1.83 | 1.8 | — | — | 2.0 |
| Air permeability (sec/100 cc) | 105 | 103 | 110 | 100 | 102 | — | — | 98 |

As shown in Table 1, in the case of Examples 1 to 4, even when $BaTiO_3$ having a relatively high dielectric constant (e.g., about 2,000) is included as the inorganic particles in the coating slurry, when hexagonal boron nitride is included at an appropriate ratio, the gas generation amount of each the inorganic particles have a dielectric constant of 150 or more, the coating layer includes the hexagonal boron nitride in an amount of 1 vol % or more to 8 vol % or less, the coating layer includes the inorganic particles in an amount of 77 vol % or more to 84 vol % or less, and a volume ratio of the inorganic particles to the hexagonal boron nitride is 7:1 to 84:1 by vol %.

2. The separator according to claim 1, wherein the inorganic particles comprise at least one selected from the group consisting of $BaTiO_3$, $Pb(Zr,Ti)O_3$ (PZT), $Pb_{1-x}La_xZr_{1-y}Ti_yO_3$ (PLZT, 0<x<1, 0<y<1), $Pb(Mg_{1/3}Nb_{2/3})O_3$—$PbTiO_3$ (PMN-PT), $SrTiO_3$, $SnO_2$, $CeO_2$, NiO, $Y_2O_3$, and $TiO_2$.

3. The separator according to claim 1, wherein the inorganic particles have an average particle size (D50) from 200 nm to 1,000 nm.

4. The separator according to claim 1, wherein the hexagonal boron nitride has an average diameter from 100 nm to 300 nm.

5. The separator according to claim 1, wherein the hexagonal boron nitride has an aspect ratio from 5 to 30.

6. The separator according to claim 1, wherein the coating layer includes the polymer binder in an amount from 10 vol % to 30 vol %.

7. The separator according to claim 1, wherein the thickness of the coating layer ranges from 0.5 μm to 2 μm.

8. An electrochemical device comprising:

a positive electrode;

a negative electrode; and a separator disposed between the positive electrode and the negative electrode, wherein the separator is the separator for an electrochemical device according to claim 1.

9. The separator according to claim 1, wherein the hexagonal boron nitride has a plate-shaped planar structure, and the coating layer has a density from 4.9 $g/cm^3$ to 6.0 $g/cm^3$.

* * * * *